United States Patent
Hoepfl et al.

(10) Patent No.: US 9,640,339 B2
(45) Date of Patent: May 2, 2017

(54) ON-LOAD TAP CHANGER, METHOD FOR INSTALLING A LOAD TRANSFER SWITCH INSERT IN THE ON-LOAD TAP CHANGER, AND KEROSENE DRAIN SCREW

(71) Applicant: Maschinenfabrik Reinhausen GmbH, Regensburg (DE)

(72) Inventors: Klaus Hoepfl, Maxhuette-Haidhof (DE); Silke Wrede, Zeitlarn (DE); Hubert Zwirglmaier, Regensburg (DE)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 0 days.

(21) Appl. No.: 14/898,404

(22) PCT Filed: Jun. 24, 2014

(86) PCT No.: PCT/EP2014/063250
§ 371 (c)(1),
(2) Date: Dec. 15, 2015

(87) PCT Pub. No.: WO2015/007470
PCT Pub. Date: Jan. 22, 2015

(65) Prior Publication Data
US 2016/0141120 A1    May 19, 2016

(30) Foreign Application Priority Data
Jul. 16, 2013 (DE) .......................... 10 2013 107 547

(51) Int. Cl.
*H01H 9/44* (2006.01)
*H01H 9/00* (2006.01)
*F16L 55/11* (2006.01)

(52) U.S. Cl.
CPC ........ *H01H 9/0005* (2013.01); *F16L 55/1108* (2013.01); *H01H 9/0044* (2013.01); *H01H 2009/005* (2013.01)

(58) Field of Classification Search
CPC ......... H01H 9/0016; H01H 2009/0022; H01H 9/0027; H01H 9/0044; H01H 9/0038;
(Continued)

(56) References Cited

U.S. PATENT DOCUMENTS 2,914,504 A    11/1959   Metzger
4,978,815 A    12/1990   Berger et al.
(Continued)

FOREIGN PATENT DOCUMENTS

DE           214247 A     10/1984
DE          4231353 A      4/1993
(Continued)

*Primary Examiner* — Edwin A. Leon
(74) *Attorney, Agent, or Firm* — Andrew Wilford

(57) ABSTRACT

An on-load tap changer has a switching tube, an oil suction pipe arranged centrally and coaxially along an axis inside the switching tube, and a kerosene drain screw so mounted in a base of the on-load tap changer that it is coaxial with an axis of the oil suction pipe, with the axis of the switching tube, and with an axis of the on-load tap changer. A bearing ring is so acted on by a resilient element at one side and radially with respect to the axis of the on-load tap changer that the switching tube and the oil suction pipe both mechanically positively cooperate with the bearing ring and are centered about the axis of the on-load tap changer.

16 Claims, 10 Drawing Sheets

(58) Field of Classification Search
CPC ...... H01H 3/3052; H01H 9/0033; H01H 3/44;
H01H 3/40; F16H 19/02; Y10T 74/18792;
H02K 11/0042; H02K 7/1166; H02K
7/1004
USPC ....... 200/11 TC, 571, 275, 61.54, 504, 11 G;
218/147; 333/107, 262; 338/215;
336/127, 65, 137, 146–150, 141, 142;
322/71; 323/255, 256, 341, 342,
323/355–359; 29/622; 251/147
See application file for complete search history.

(56) References Cited

U.S. PATENT DOCUMENTS

| | | | |
|---|---|---|---|
| 5,107,200 A | | 4/1992 | Dohnal |
| 5,834,717 A | | 11/1998 | Neymeyer |
| 7,692,523 B2 | * | 4/2010 | Colmenero ............. H01F 29/02 |
| | | | 323/205 |
| 2011/0063064 A1 | * | 3/2011 | Albrecht ................ H01F 27/14 |
| | | | 336/94 |

FOREIGN PATENT DOCUMENTS

| | | |
|---|---|---|
| DE | 10055406 B | 4/2002 |
| DE | 102007004530 A | 9/2007 |
| FR | 2453480 A | 10/1980 |

\* cited by examiner

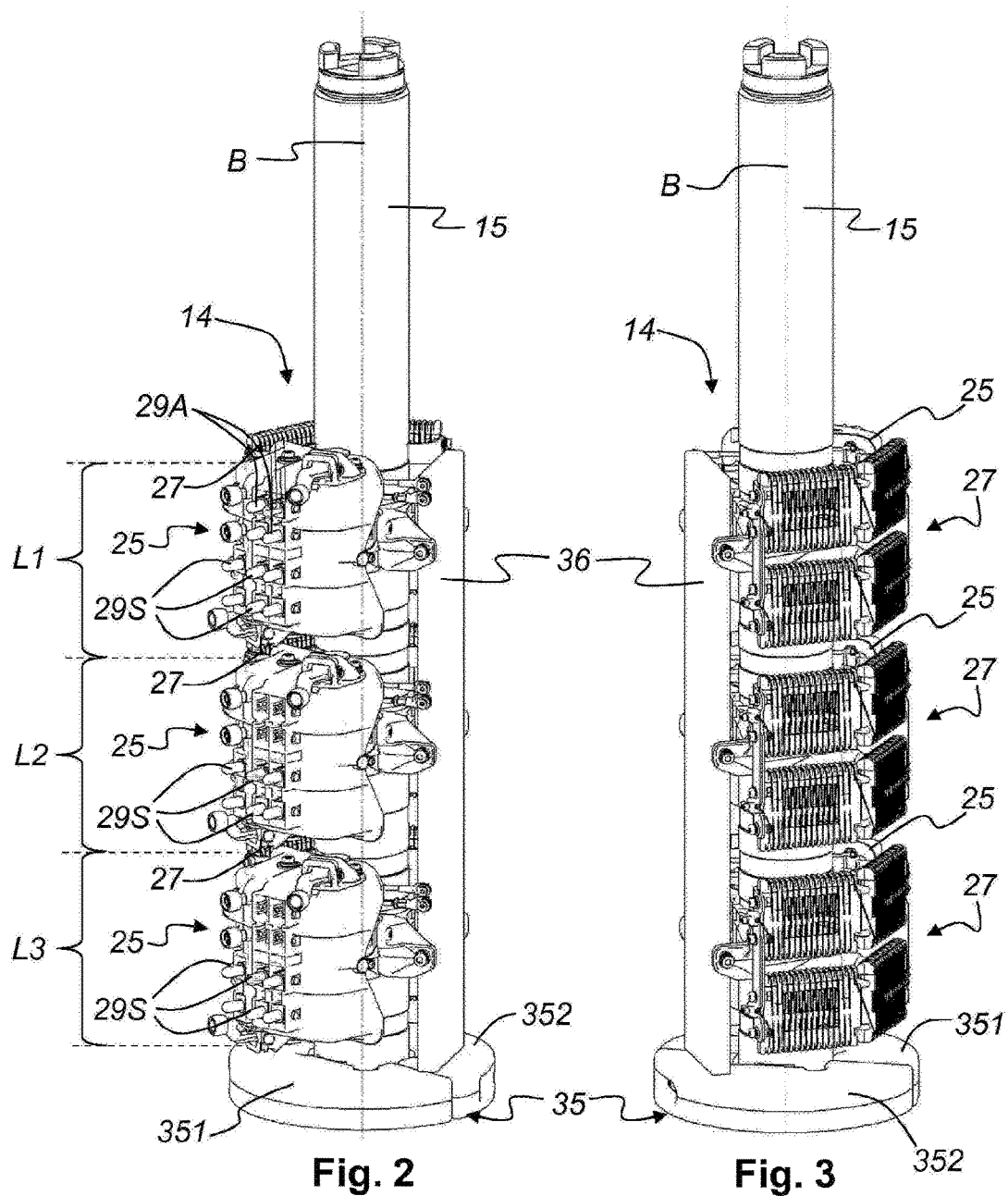

ON-LOAD TAP CHANGER, METHOD FOR INSTALLING A LOAD TRANSFER SWITCH INSERT IN THE ON-LOAD TAP CHANGER, AND KEROSENE DRAIN SCREW

CROSS REFERENCE TO RELATED APPLICATIONS

This application is the US-national stage of PCT application PCT/EP2014/063250 filed 24 Jul. 2014 and claiming the priority of German patent application 102013107547.9 itself filed 16 Jul. 2013.

FIELD OF THE INVENTION

The present invention relates to an on-load tap changer. In particular, the invention relates to an on-load tap changer comprising a switching tube and an oil suction pipe of an on-load tap changer, the oil suction pipe extending centrally and coaxially along an axis within the switching tube. In addition, a kerosene drain screw is provided that is so mounted in a base of the on-load tap changer that it is coaxial with respect to the axis of the oil suction pipe, the axis of the switching tube and an axis of the on-load tap changer.

In addition, the invention relates to a method of mounting a load changeover switch insert and an oil suction pipe in an oil tank of an on-load tap changer.

Moreover, the invention relates to a kerosene drain screw in a base of an on-load tap changer.

BACKGROUND OF THE INVENTION

On-load tap changers (in abbreviation OLTC) are generally known and conventional in the prior art. They serve for uninterrupted switching over between different winding taps of tapped transformers.

Such on-load tap changers are divided into load selectors and load changeover switches with selectors.

In a load changeover switch with a selector, such as disclosed in, for example, German Patent Specification DE 100 55 406 C1, the selector, consisting of a fine selector and possibly a preselector, is arranged below the load changeover switch. The selector serves for power-free selection of the respective new winding tap of the tapped transformer that is to be switched over to. The load changeover switch serves for the subsequent rapid and uninterrupted switching over from the connected winding tap to the new, preselected winding tap to be switched over to.

Load selectors such as described in, for example, German Patent Specification DE 28 33 126 serve, just like load changeover switches with selectors, the purpose of switching over the taps of the regulating windings of these tapped transformers under load and thus selectively compensate for voltage changes at the user. Through dispensing with the separation of the load changeover switch from the selector, load selectors can be produced more economically.

Both kinds of on-load tap changers are actuated by a motor drive during the switching over. A drive output or drive input shaft that draws up an energy store is moved by the motor drive. When the energy store is completely drawn up, i.e. stressed, it is unlatched, abruptly releases its energy and actuates, in the space of milliseconds (ms) a switching tube that then executes a specific switching sequence during the load changeover. In that case, different switch contacts and resistance contacts are then actuated in a specific time sequence. The switching contacts in that case serve for direct connection of the respective winding tap with the load diverter and the resistance contacts for temporary connection, i.e. bridging-over by means of one or more switching-over resistances. Advantageously, vacuum interrupters are used as switching elements for the load changeover. This is based on the fact that the use of vacuum interrupters for load changeover prevents formation of arcs in oil and thus oil contamination of the load changeover switch oil, as described in, for example, German Patent Specifications DE 195 10 809 [U.S. Pat. No. 5,834,717] and DE 40 11 019 [U.S. Pat. No. 5,107,200] and German published specifications DE 42 31 353 and DE 10 2007 004 530.

A drain device for liquids at load changeover switches for transformers is known from Patent Specification DD 214 247 B1, in which the oil suction pipe and the closure screw are arranged along an axis. In a first embodiment, the oil suction pipe is used for actuation of the closure screw. For that purpose the oil suction pipe is connected with the closure screw by way of a mechanically positive adapter. Mounted on the upper end of the oil suction pipe is a fitting by way of which a connecting stub pipe thereof is connected with an oil suction line when the closure screw is open. In a second embodiment, the oil suction pipe and closure screw are constructed as a unit. For that purpose the fitting is rotatably mounted and sealed by sealing elements and an oil suction stub pipe is connected with the oil suction pipe by a channel system.

In the case of known on-load tap changers the switching tube has to be mounted in the oil tank offset and obliquely with respect to the center axis thereof during mounting of the switching tube and the oil suction pipe in the oil tank so as to avoid the risk of damage to the actuating elements, switch contacts and switching segments. This was previously undertaken by a special mounting tool that had to be additionally supplied to customers for this purpose. The kerosene drain screw can be actuated from the inside only after dismounting of the switching tube and with a very lengthy and thus impractical and inconvenient special wrench, which represents a substantial expenditure time and equally a cost factor.

OBJECT OF THE INVENTION

An object of the invention is to create an on-load tap changer in which the mounting and dismounting of the load changeover switch insert with the switching tube and the oil suction tube takes place with little effort, free of damage and without use of special tools.

A further object of the invention is to create a method of mounting a load changeover switch insert with switching tube and an oil suction pipe in an on-load tap changer in which the mounting and dismounting of the switching tube and the oil suction pipe is carried out with little effort, free of damage and without use of special tools.

An additional object of the invention is to design and arrange a kerosene drain screw for an on-load tap changer in such a way that the actuation thereof can be carried out simply, rapidly, safely and economically.

SUMMARY OF THE INVENTION

The on-load tap changer according to the invention comprises a switching tube with switching segments and an oil suction pipe. The oil suction pipe is in that case arranged centrally along an axis within the switching tube. The on-load tap changer comprises a kerosene drain screw that is so mounted in a base of the on-load tap changer that it is oriented coaxially with respect to the oil suction pipe, the switching tube and the on-load tap changer.

The bearing ring is displaced, without mounted oil suction pipe, with respect to the axis A of the on-load tap changer. According to the invention a bearing ring is acted on by a resilient element at one side and radially with respect to the axis of the on-load tap changer in such a way that a direction of displacement is predetermined by the resilient element and for dismounting of the switching tube the bearing ring is returned again to the displaced position. The switching tube and the oil suction pipe are designed in such a way that the two mechanically positively cooperate with the bearing ring and are centered with respect to the axis of the on-load tap changer. As a result, the load changeover switch insert with the switching tube and the oil suction pipe are also centered along this axis of the on-load tap changer. A counter-bearing is preferably mounted at the base of the on-load tap changer and receives the resilient element cooperating with the bearing ring. In preferred manner, the resilient element is constructed as a helical compression spring.

In one form of embodiment a suction stub pipe is arranged at a lower end of the oil suction pipe and by virtue of its specially constructed shape is inserted mechanically positively between the bearing ring and an inwardly directed domed protrusion of the base or bears mechanically positively against the bearing ring and the domed protrusion of the base. The kerosene drain screw is in that case preferably disposed within the inwardly directed domed protrusion of the base.

In that case, the load changeover switch insert together with switching tube is inserted into the oil tank of the on-load tap changer to be offset with respect to an axis of the on-load tap changer and is positioned on a bearing ring by means of a bearing mounted at a lower end of the switching tube. The bearing ring is loaded on one side and radially with respect to the axis of the on-load tap changer by a resilient element, whereby an axis of the switching tube and an axis of the bearing ring are offset with respect to the axis of the on-load tap changer. The oil suction pipe is similarly inserted to be offset with respect to the axis of the on-load tap changer and then placed on a domed protrusion that is formed inwardly in the axis of the on-load tap changer, of a base. A guided positioning is made possible by a cone guide mounted at an inner side of the switching tube. The centering of the switching tube and of the oil suction pipe with respect to the axis of the on-load tap changer is carried out in that the bearing ring that is loaded by the resilient element, is centered with respect to the axis of the on-load tap changer. In that case, the resilient element is compressed by the cooperation of a suction stub pipe that is arranged at the lower end of the oil suction pipe, with the bearing ring and with the stationary domed protrusion of the base and thus the bearing ring is so displaced that the bearing ring is disposed in centered alignment with respect to the axis of the on-load tap changer.

In the mounted state of the load changeover switch insert the axis of the switching tube, the axis of the oil suction pipe and the axis of the on-load tap changer coincide. Through the coincidence of the axes, a key and a kerosene drain screw are centered with respect to the axis of the on-load tap changer and mechanically positioned on one another so that the key and the kerosene drain screw mechanically positively cooperate.

For dismounting of the on-load tap changer, initially the oil suction pipe is removed from the switching tube, whereby the compressed resilient element relaxes again and thus the bearing ring and the switching tube positioned on the bearing ring displace into a position offset with respect to the axis of the on-load tap changer. After removal of the oil suction pipe, the switching tube can be removed from the oil tank. Damage to the actuating elements, diverter contacts, tap contacts and switching segments is avoided by the position that is now offset with respect to the axis of the on-load tap changer, of the bearing ring and the switching tube.

The kerosene drain screw according to the invention is seated in a domed protrusion in a base of the on-load tap changer. The kerosene drain screw is mounted to be movable in the direction of an axis of the on-load tap changer and carries a cover disk by which an opening for the kerosene outlet in the base of the on-load tap changer can be closed or opened.

An encircling ring is preferably fastened to the kerosene drain screw. The ring cooperates with an abutment in the base in order to limit an opening movement of the kerosene drain screw. Preferably also, a key with a key element is provided. The key is arranged in an oil suction pipe of the on-load tap changer. The key element mechanically positively cooperates with the kerosene drain screw so that the kerosene drain screw can be actuated by turning the oil suction pipe.

When the kerosene drain screw is closed, the cover can be in engagement with an annular depression in the base and the opening for the kerosene outlet is closed by means of a seal. It is ensured by means of the seal that the opening is thereby closed and thus, in operation, the transformer oil is separated from or not mixed with the on-load tap changer oil.

In a first form of embodiment the cover is a separate component that is attached to the kerosene drain screw.

In a second form of embodiment the cover and the kerosene drain screw form an integral component. Here, too, the opening for the kerosene outlet is preferably closed by means of a seal when the kerosene drain screw is closed. In addition, the kerosene drain screw is provided with an annular cap that is so biased relative to the cover by at least one resilient element that the key surface of the kerosene drain screw is inaccessible to a tool.

In order to be able to open the kerosene drain screw when the on-load tap changer is installed in a transformer housing the oil suction pipe has to be turned, which is possible by a key surface formed at the upper end of the on-load tap changer. The rotation of the oil suction pipe is transmitted by way of the key element of the key to the kerosene drain screw. The key element and the kerosene drain screw are mechanically positively coupled together.

An advantage of the on-load tap changer according to the invention is that handling for the mounting and dismounting of the switch column and of the oil suction pipe as well as opening and closing of the kerosene drain screw are simplified. Inspection of the on-load tap changer can thus be carried out more easily. Actuation of the kerosene drain screw at the time of drying in the transformer production process can be carried out without a special tool and consequently in economic manner.

A further advantage of the on-load tap changer according to the invention is that the additional special tools previously necessary for mounting and dismounting the switching tube and the oil suction pipe are eliminated.

BRIEF DESCRIPTION OF THE DRAWING

The invention and advantages thereof are described in more detail in the following with reference to the accompanying drawings, in which:

FIG. 2 is a perspective view of a load changeover switch insert of the three-phase load selector according to FIG. 1 with three switching segments fastened to the switching tube;

FIG. 3 is another perspective view of the load changeover switch insert according to FIG. 2;

SPECIFIC DESCRIPTION OF THE INVENTION

Figure 1:
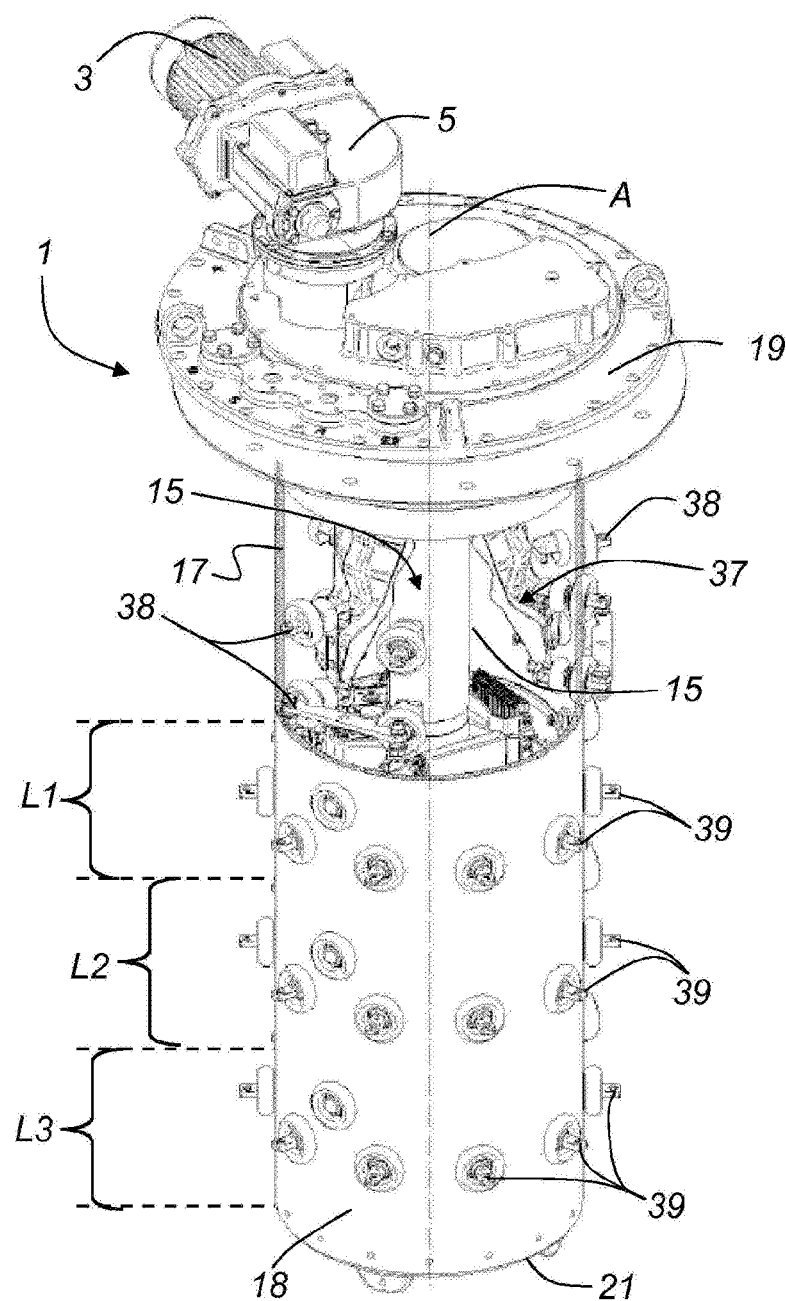
FIG. 1 is a perspective view of a form of embodiment of the on-load tap changer according to the invention in the form of a three-phase load selector.

Identical reference numeral are used for the same or equivalent elements of the invention. Moreover, for the sake of clarity only reference numerals required for description of the respective FIG. are illustrated in the individual figures. The illustrated forms of embodiment merely represent examples of how the on-load tap changer according to the invention and the kerosene drain screw according to the invention can be designed and thus do not represent a definitive limitation of the invention.

FIG. 1 shows a perspective view of a form of embodiment of the on-load tap changer according to the invention in the form of a three-phase on-load tap changer or load selector 1. The load selector 1 comprises a drive 3 such as, for example, an electric motor, with a transmission 5 that draws up an energy store (not illustrated). When the energy store is fully drawn up, i.e. stressed, it is unlatched, abruptly releases its energy and actuates a switching tube 15 of a load changeover switch insert 14. The switching tube 15 rotating about an axis A of the load selector 1 is in that case mounted in an oil tank 18. The oil tank 18 is closed upwardly by a cover 19 and additionally carries a base 21.

In the illustration according to FIG. 1, the load selector 1 according to the invention has a first phase L1, a second phase L2 and a third phase L3 that are arranged one above the other in the oil tank 18. A preselector 37 is seated above the three phases L1, L2, L3. In the view illustrated here, electrical terminal elements 38 for preselector contacts are provided at the oil tank wall 17 of the oil tank 18. Electrical terminal elements 39 for tap contacts 392 (see FIGS. 7 to 10) of the three phases L1, L2, L3 are similarly so arranged at the load selector 1 that they pass through the oil tank wall 17 of the oil tank 18.

FIGS. 2 and 3 show different perspective views of the load changeover switch insert 14 of the three-phase load selector 1 according to FIG. 1. Three switching segments 25 are fastened to the switching tube 15 of the load changeover switch insert 14 so that the load selector 1 is divided into the three phases L1, L2, L3. Apart from the switching segments 25, resistance arrangements 27 associated with the individual phases L1, L2, L3 of the load selector 1 are also fastened to the switching tube 15. Through rotation of the switching tube 15, contacts 29S for tap contacts 392 or contacts 29A for diverter contacts 391 are directly connected, wherein the contacts 29S, 29A (only in the first phase L1) cooperate with corresponding diverter contacts 391 (not illustrated here) or tap contacts 392 (similarly not illustrated) (see, with respect thereto, FIGS. 7 to 10). A predetermined switching sequence is realized by means of the control cams (not illustrated), in which a plurality of vacuum interrupters (not illustrated) in the individual switching segments 25 are opened or closed.

In the form of embodiment according to FIGS. 2 and 3 a flywheel mass 35 is mounted on the switching tube 15 of the load changeover switch insert 14. In addition, the switching tube 15 carries a high-mass element 36, as described in the following. The switching tube 15 or the load changeover switch insert 14 defines an axis B about which both the switching tube 15 and the load changeover switch insert 14 rotate or pivot.

Figure 4:
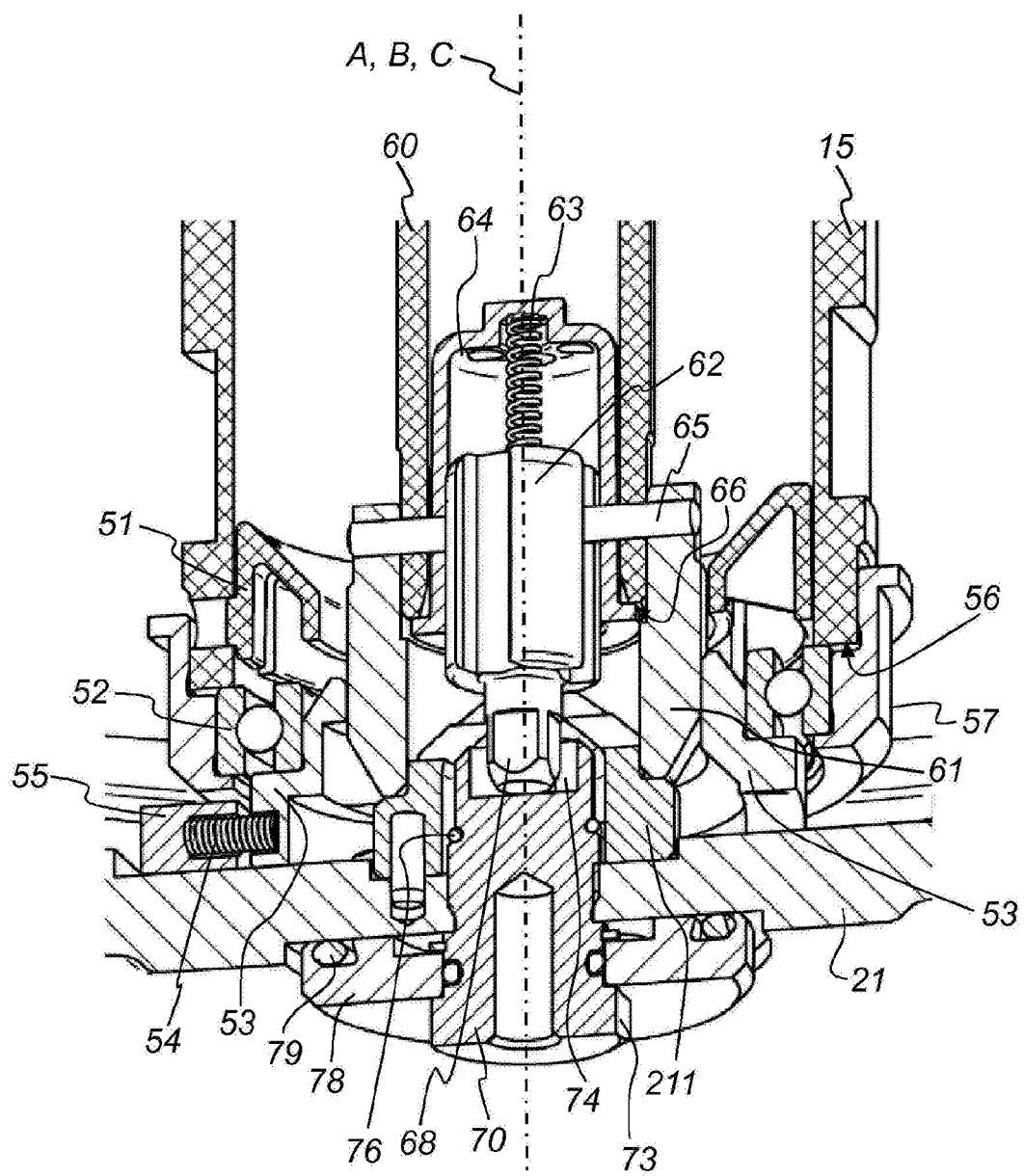
FIG. 4 is a sectional illustration of the region of the oil suction pipe, wherein a first form of embodiment of the kerosene drain screw according to the invention is illustrated in closed state.
Figure 5:
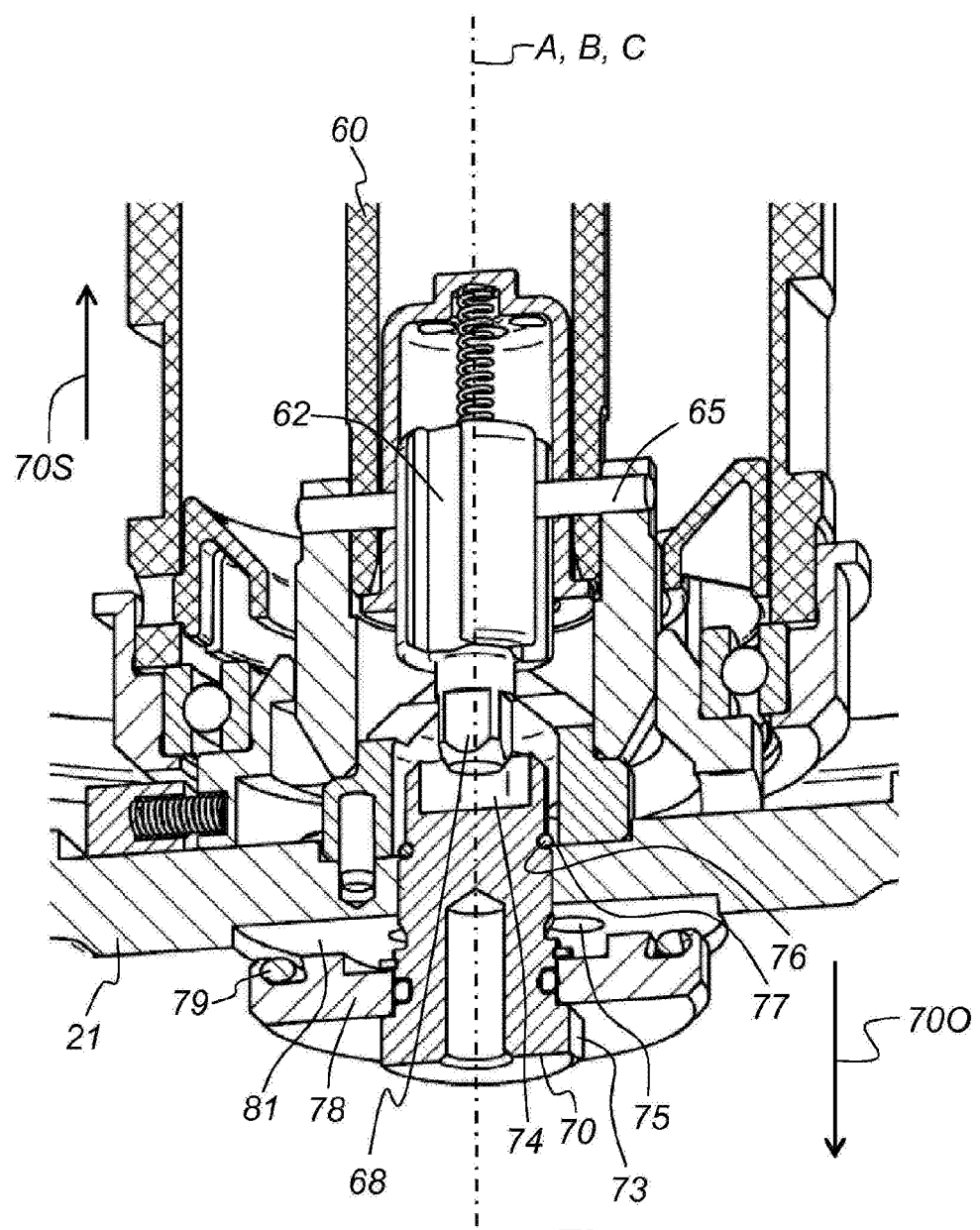
FIG. 5 is a sectional illustration of the vicinity of the oil suction pipe of FIG. 4, in which the kerosene drain screw is open.

FIGS. 4 and 5 show detailed sectional illustrations that clarify the arrangement of a first form of embodiment of the kerosene drain screw 70 according to the invention in the base 21 of the on-load tap changer 1 and the cooperation of an oil suction pipe 60 of the on-load tap changer 1 with the kerosene drain screw 70. In FIG. 4 the kerosene drain screw 70 is closed and in FIG. 5 it is open.

The switching tube 15 or the load changeover switch insert 14 and the oil suction pipe 60 are, in the operational state, so arranged in the oil tank 18 that the axis A of the load changeover switch 1, the axis B of the switching tube 15 and an axis C of the oil suction pipe 60 coincide. The kerosene drain screw 70 is illustrated in FIG. 4 in the closed state. The kerosene drain screw 70 mechanically positively cooperates with a key element 68 of a key 62. The kerosene drain screw 70 has a thread by way of which, through rotation by means of the key element 68, opening and closing is possible such that the opening 75 is freed. A limitation is provided by the encircling ring 76 so that the key element 68 does not come out of engagement with the kerosene drain screw 70. If the key element 68 should come out of engagement with the kerosene drain screw 70, closing would no longer be possible.

The kerosene drain screw 70 has a key surface 73 on which a tool (not illustrated) for actuating the kerosene drain screw 70 can be placed. The kerosene drain screw 70 is formed with a shaped portion 74 in which the key element 68 of the key 62 mechanically positively engages. In the form of embodiment illustrated in FIG. 4, the kerosene drain screw 70 can be opened by way of rotation of the oil suction pipe 60, wherein the rotation is transmitted by way of the key 62 and the key element 68 to the kerosene drain screw 70. The key 62 is coupled by way of a pin 65 to the oil suction pipe 60 and the suction stub pipe 61 to be secure against relative rotation. The kerosene drain screw 70 also can be actuated by a suitable tool (not illustrated) via the key surface 73.

A resilient element 63 cooperates with a counter-bearing 64 in the oil suction pipe 60 and acts in such a way on the key 62 that the key element 68 comes into engagement with the kerosene drain screw 70 during mounting. The resilient element 63 also facilitates mounting of the oil suction pipe 60, since, when the oil suction pipe 60 is pressed in, the key 62 with key element 68 is not blocked, but resiliently yields and then, through rotation, is disposed in the shaped portion 74 of the kerosene drain screw 70. In the open state, as illustrated in FIG. 5, the kerosene drain screw 70 and the key 62 are spaced somewhat from one another in axial direction B of the switching tube 15. The spacing or maximum spacing between the kerosene drain screw 70 and the key 62 is so dimensioned that the shaped portion 74 of the kerosene drain screw 70 and the key element 68 always remain in engagement with one another. Here, at least one opening 75, by way of which the kerosene can be drained out, is freed by the rotation of the kerosene drain screw 70 in the base 21 of the on-load tap changer 1.

In order to ensure that the shaped portion 74 and the key element 68 are in mechanically positive engagement, an encircling ring 76 that cooperates with an at least partly encircling abutment 77, is mounted on the kerosene drain screw 70. The opening movement 700 of the kerosene drain screw 70 in the direction of the axis C of the oil suction pipe 60 is thus limited and the above-explained condition of the physical relationship of shaped portion 74 and key element 68 can be maintained. Regardless of whether the kerosene drain screw 70 is actuated from below by way of the key surface 73 of the kerosene drain screw 70 or from above by way of an upper key surface 100 (see FIG. 11) of the oil suction pipe 60, a cover 78 mounted on the kerosene drain screw 70 is moved therewith in such a way that the opening 75 in the base 21 is free and the kerosene can flow out unhindered. The cover 78 is substantially disc-shaped and carries a seal 79 that in the closed state of the kerosene drain screw 70 sealingly cooperates with the base 21.

Figure 6:
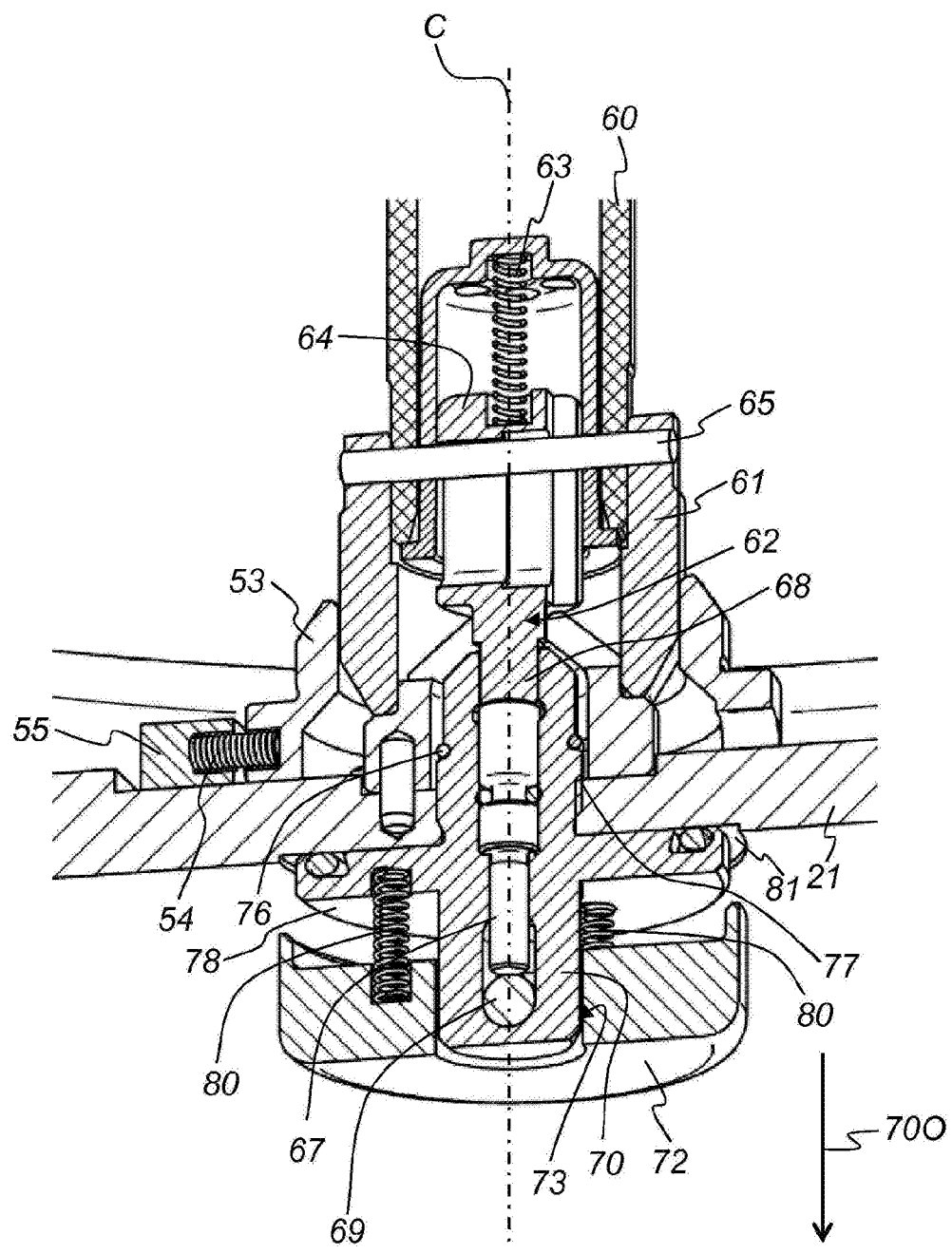
FIG. 6 is a sectional illustration of the vicinity of the oil suction pipe, in which a second form of embodiment of the kerosene drain screw according to the invention is illustrated in closed state.

FIG. 6 shows a sectional illustration of the region of the oil suction pipe 60, in which a second form of embodiment of the kerosene drain screw 70 is illustrated in the closed state. In the illustration shown in FIG. 6, the switching tube 15 is omitted for reasons of clarity.

In this form of embodiment the kerosene drain screw 70 is provided with a cap 72 that is so loaded and biased relative to the cover 78 by resilient elements 80, for example springs 80, in the direction of the axis C of the oil suction pipe 60 that the key surface 73 of the kerosene drain screw 70 is not accessible, in particular inaccessible to a tool. An engineer presses from below on the cap 72 and the key surface 73 is freed, so that a suitable tool can be fitted in order to turn the kerosene drain screw 70. The key 62 is similarly in mechanically positive engagement with the kerosene drain screw 70 by way of a key element 68 that can be formed as a square. The actuation of the kerosene drain screw 70 is carried out as already described in FIGS. 4 and 5. However, since in specific switch constructions the upper connection of the oil suction pipe 60 is not rotatable after final mounting, in order to be actuated from below the key element 68 has to be brought out of engagement with the kerosene drain screw 70. Serving for that purpose is the transverse pin 69 that is fixedly seated in the cap 72 for the kerosene drain screw 70. When the cap 72 is pressed up, the transverse pin 69 lifts the pin 67. The pin 67 thus shifts the key 62 together with the key element 68 out of engagement so that co-rotation of the oil suction pipe 60 when the kerosene drain screw 70 is actuated is prevented. After lowering of the cap 72 by the transverse pin 69 and the pin 67 the key 62 is also brought back into engagement by means of the resilient element 63 for actuation from above. The kerosene drain screw 70 has the encircling ring 76 that cooperates with the at least partly encircling abutment 77. The key 62, resilient element 63 and key head 64 are, on actuation of the cap 70, so moved along the axis C of the oil suction pipe 60 that the key 62 is always in mechanically positive engagement with the kerosene drain screw 70.

FIGS. 7 to 10 show sectional illustrations of the oil tank 18 during positioning of the load changeover switch insert 14 together with switching tube 15 in the oil tank 18 and positioning and pre-centering of the oil suction pipe 60 as well as the final position of the load changeover switch insert 14 and the oil suction pipe 60 in the on-load tap changer 1.

Figure 7:
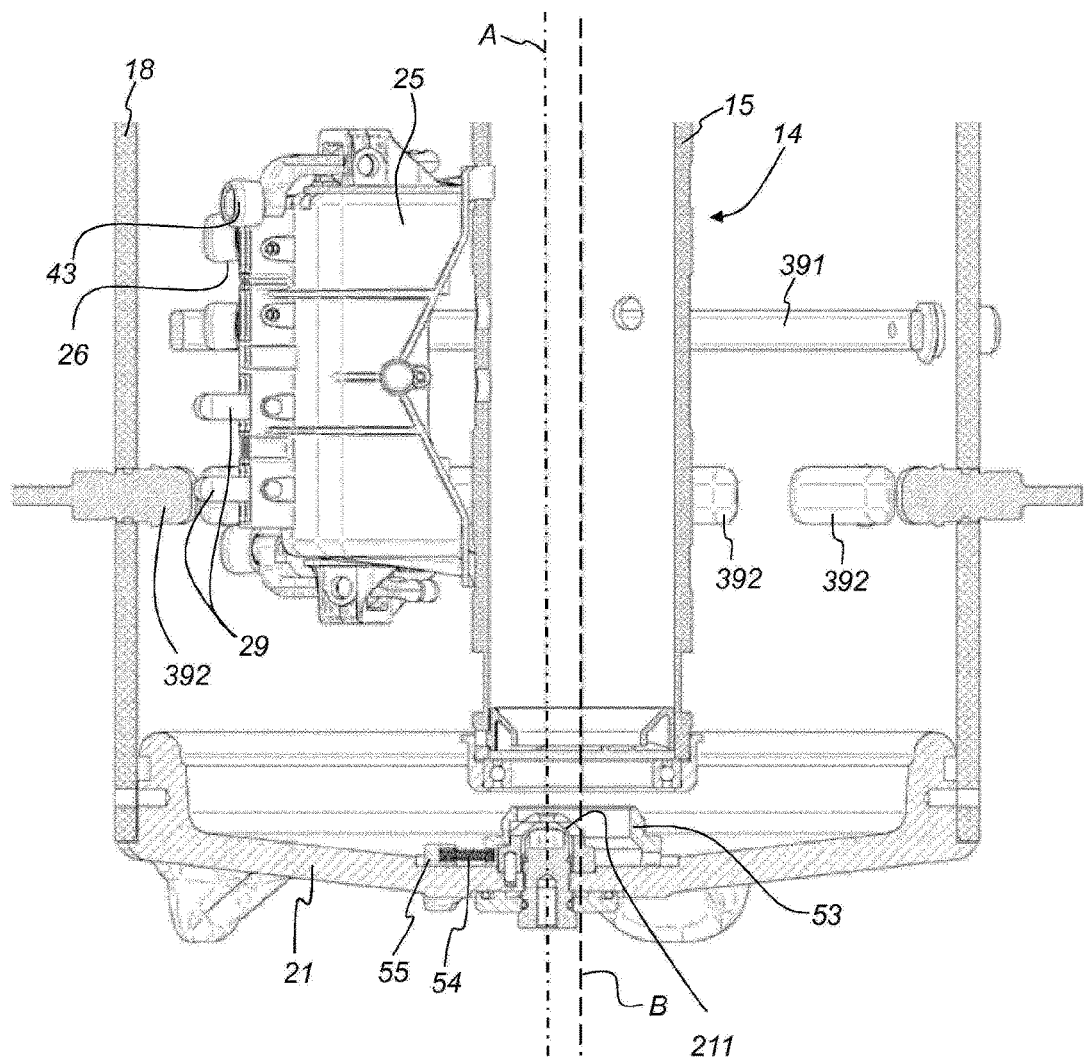
FIG. 7 is a sectional illustration of the oil tank, which clarifies mounting of the switching tube in the oil tank.

A sectional illustration of the oil tank 18 is illustrated in FIG. 7, in which the phase of insertion of the load changeover switch insert 14 into the oil tank 18 is depicted. The load changeover switch insert 14 comprises the switching tube 15 with at least one switching segment 25, a resistance arrangement (not illustrated), the flywheel mass 35 and the high-mass element 36 (see FIGS. 2 and 3). A bearing ring 53 is loaded at one side and radially by a resilient element 54 and a counter-bearing 55 that receives the resilient element 54 (see, with respect thereto, also FIG. 4); the load changeover switch insert 14 with the switching tube 15 and the mounting ring 57 can thus be lowered onto the bearing ring coaxially with respect to the axis A of the on-load tap changer 1. In that case, the control contacts 79, control rollers 26 and rollers 43 of the switching segment can pass by the diverter contacts 391 and tap contacts 392 without problems. A suction stub pipe 61 (see FIG. 8) mounted at a lower end 66 of the oil suction pipe 60 lies mechanically positively between the bearing ring 53 and an inwardly directed domed protrusion 211 of a base 21 of the oil tank 18. The bearing ring 53 equally serves for alignment of the switching tube 15 along the axis A of the on-load tap changer 1, so that the switching tube 15 and the oil suction pipe 60 both mechanically positively cooperate with the bearing ring 53 and are centered about the axis A of the on-load tap changer 1 in that the axis B of the switching tube 15 is offset relative to the axis A of the on-load tap changer. For that purpose, the switching tube 15 is mechanically positively seated by mounting ring 57 and bearing 52 that is seated at the lower end 56 of the switching tube 15, on the bearing ring 53.

The bearing ring 53 is arranged at the base 21 of the oil tank 18 and acted on at one side and radially with respect to the axis A of the on-load tap changer 1 by the resilient element 54 such that this is offset parallel to the axis A of the on-load tap changer 1. The switching tube 15 of the load changeover switch insert 14 is lowered offset into the oil tank 18 in such a way that the axis B of the switching tube 15 is parallelly offset with respect to the axis A of the on-load tap changer 1. This is necessary so that the control contacts 29 of the switching segment 25 can be led past diverter contacts 391 or tap contacts 392 of the on-load tap changer 1 when the load changeover switch insert 14 is inserted. Damage to the control contacts 29, diverter contacts 391 and tap contacts 392 is to be avoided during insertion of the switching tube 15.

Figure 8:
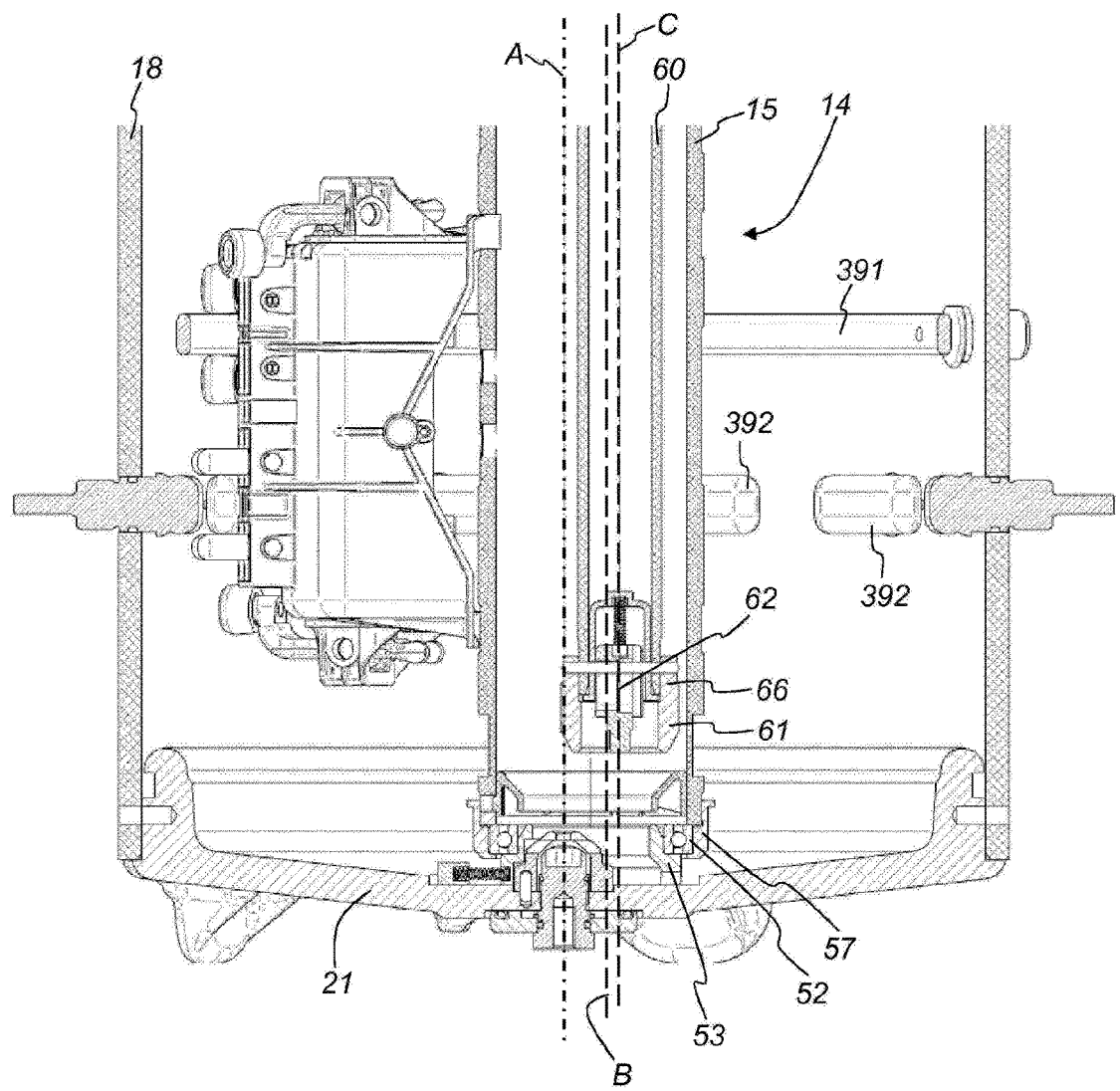
FIG. 8 is a sectional illustration of the oil tank during mounting of the oil suction pipe in the pre-positioned switching tube.
Figure 9:
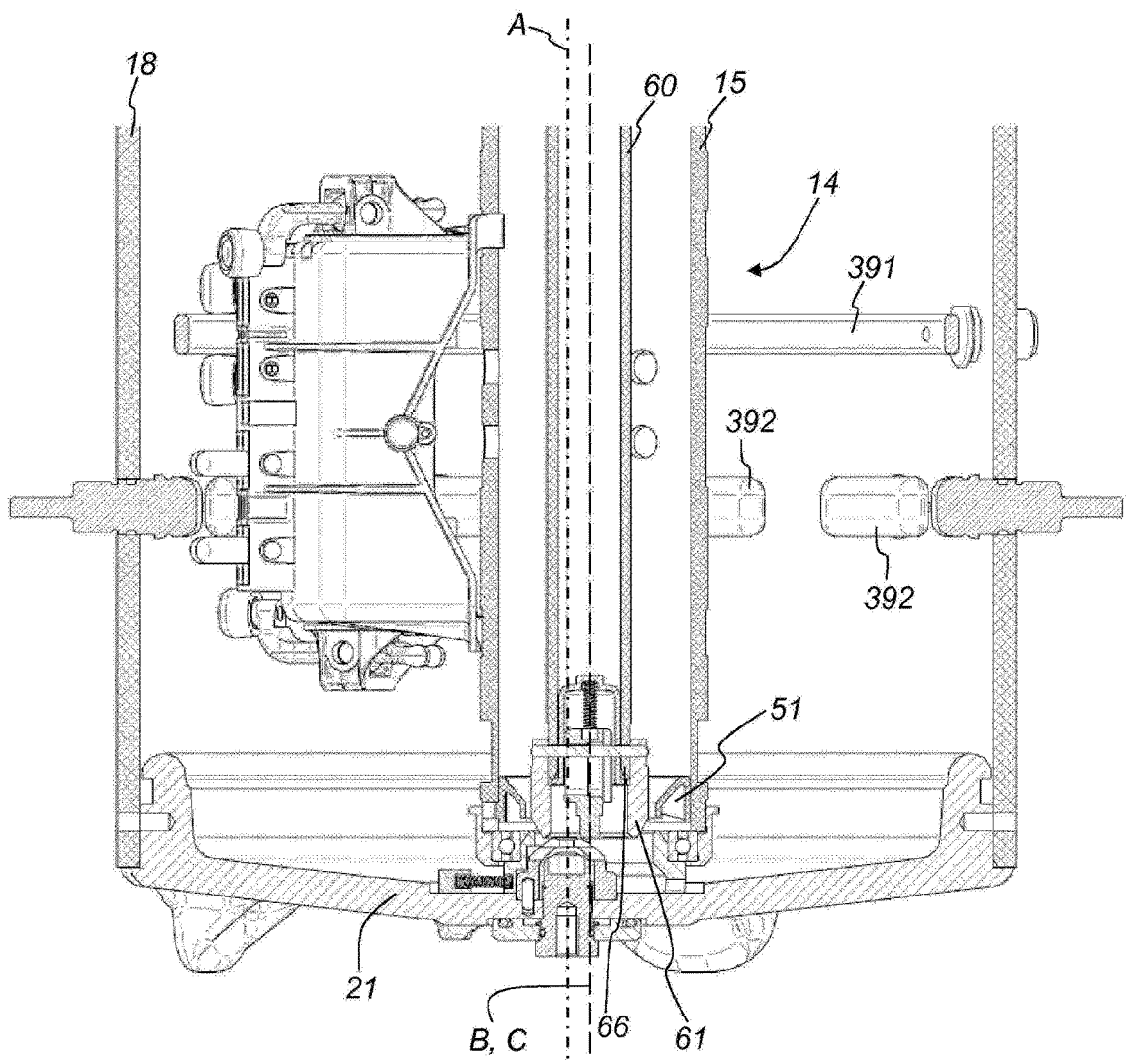
FIG. 9 is a sectional illustration of the oil tank, in which the oil suction pipe is pre-centered in the switching tube.
Figure 10:
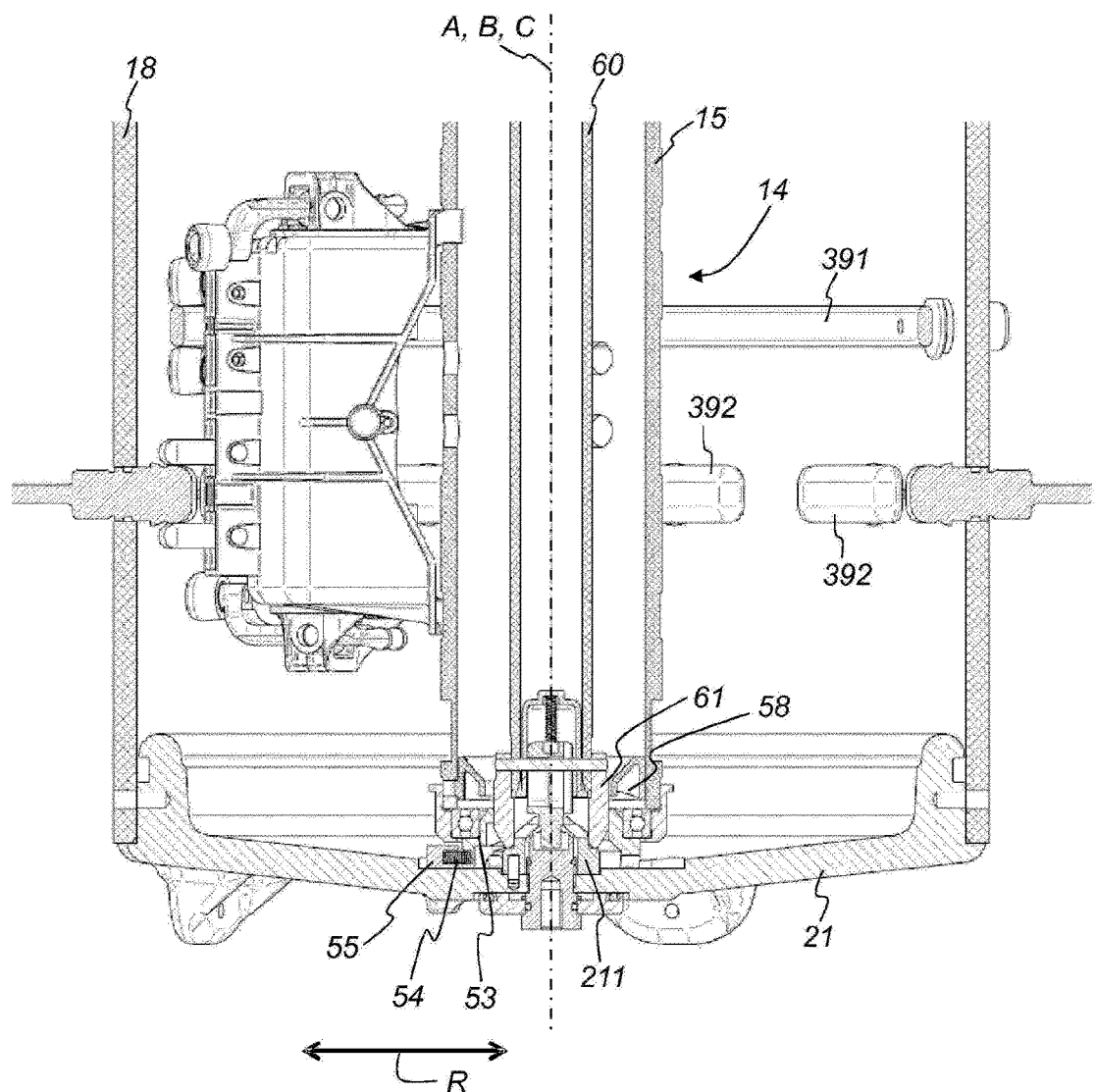
FIG. 10 is a sectional illustration of the oil tank, in which switching tube and oil suction pipe are disposed in the end position and the switching tube and oil suction pipe are centered about the axis of the oil tank.

With reference to FIGS. 8 to 10, the switching tube 15 is placed on the bearing ring 53 by way of a mounting ring 57 that is provided at a lower end 56 of the switching tube 15, with the bearing 52, so that the axis B of the switching tube 15 is again parallelly offset with respect to the axis A of the on-load tap changer 1. The oil suction pipe 60 is inserted into the switching tube 15 with its axis C offset with respect to the axis B of the switching tube 15. The oil suction tube 60 has a suction stub pipe 61 mounted at its lower end 66. A guided positioning is made possible by way of a cone guide 51 at the inner diameter of the switching tube 15 and by way of the suction stub pipe 61. The oil suction pipe 60 is arranged within the switching tube 15. The axis C of the oil suction pipe 60 and the axis B of the switching tube 15 are led together by means of a centering ring 58. Switching tube 15 and oil suction pipe 60 are in that case still offset with respect to the axis A of the on-load tap changer 1.

The switching tube 15 and the oil suction pipe 60 are centered along the axis A of the on-load tap changer 1 by the special shape of the suction stub pipe 61 that is so constructed that it is adapted to the shapes of the inwardly directed domed protrusion 211 of the base 21 and the bearing ring 53 and thereby displaces between these. The resilient element 54 is in that case compressed and the domed protrusion 211 keeps the switching tube 15 and the oil suction pipe 60 in this centered position. The axis C of the oil suction pipe 60, the axis B of the switching tube 15 and the axis A of the on-load tap changer 1 coincide. The resilient element 54 is received by a counter-bearing 55 and limited by this in its movement in horizontal direction R. During dismounting, for example servicing of the oil suction pipe 60, the centering of the axes A, B and C by means of the resilient element 54 is cancelled again, whereby the load changeover switch insert 14 can be removed without problems.

Figure 11:
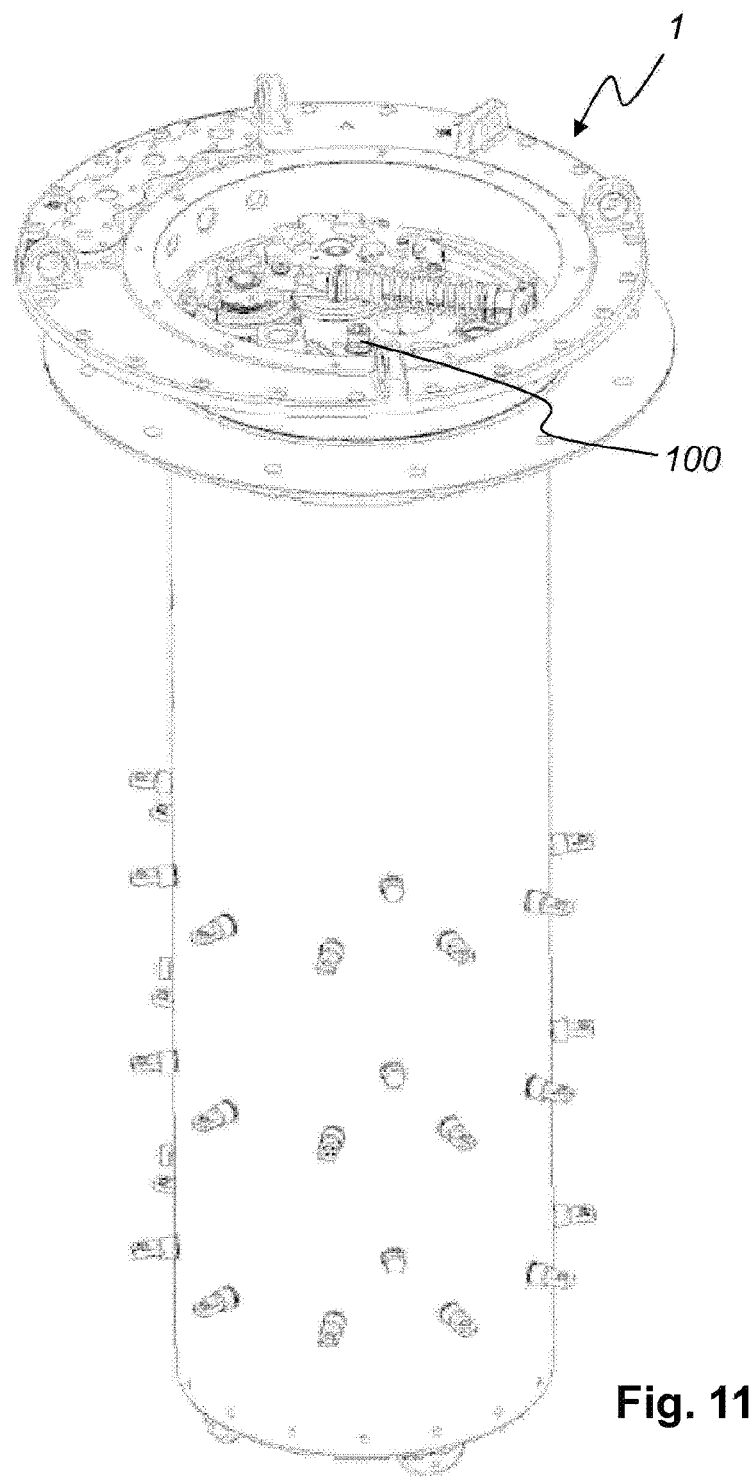
FIG. 11 is a perspective view of a form of embodiment of the on-load tap changer according to the invention, in which the accessibility of the key surface for actuation of the oil suction pipe is apparent.

A perspective view of a form of embodiment of the on-load tap changer 1 according to the invention in which the accessibility and position of an upper key surface 100 for actuation of the oil suction pipe 60 is apparent is illustrated in FIG. 11. The oil suction pipe 60 is turned by actuation of the upper key surface 100, whereby the kerosene drain screw 70 can be opened by means of the rotation of the oil suction pipe 60. As already mentioned above, the rotational movement of the oil suction pipe 60 is transmitted to the kerosene drain screw 70 by way of the key element 68 of the key 62 and the mechanically positive coupling thereof.

The invention claimed is:

1. An on-load tap changer comprising:
 a switching tube;
 an oil suction pipe arranged centrally and coaxially along an axis inside the switching tube;
 a kerosene drain screw so mounted in a base of the on-load tap changer that it is coaxial with an axis of the oil suction pipe, the axis of the switching tube and an axis of the on-load tap changer; and
 a bearing ring so acted on by a resilient element at one side and radially with respect to the axis of the on-load tap changer that the switching tube and the oil suction pipe both mechanically positively cooperate with the bearing ring and are centered about the axis of the on-load tap changer.

2. The on-load tap changer according to claim 1, further comprising:
 a counter-bearing mounted at the base of the on-load tap changer and holding the resilient element cooperating with the bearing ring.

3. The on-load tap changer according to claim 1, wherein the resilient element is a helical compression spring.

4. The on-load tap changer according to claim 1, further comprising:
 a suction stub pipe at a lower end of the oil suction pipe and mechanically positively bearing against the bearing ring and against an inwardly convex domed protrusion of the base.

5. The on-load tap changer according to claim 4, wherein the kerosene drain screw is provided within the inwardly convex protrusion of the base.

6. A method of mounting a load changeover switch insert with a switching tube and an oil suction pipe in an on-load tap changer, the method comprising the following steps:
 inserting the load changeover switch insert together with the switching tube into an oil tank of the on-load tap changer such that the switching tube is offset from an axis of the on-load tap changer;
 positioning the switching tube that has a bearing at a lower end, on a bearing ring that is acted on at one side and radially with respect to the axis of the on-load tap changer by a resilient element such that an axis of the switching tube is offset from the axis of the on-load tap changer;
 placing the oil suction pipe on a domed protrusion that is formed on the base in fixed location coaxially with respect to the axis of the on-load tap changer such that a guided positioning is made possible by a cone guide at an inner side of the switching tube; and
 centering the switching tube and the oil suction pipe with respect to the axis of the on-load tap changer by urging the bearing ring by the resilient element to be centered with respect to the axis of the on-load tap changer by the cooperation of a suction stub pipe at the lower end of the oil suction pipe, with the bearing ring and with the stationary domed protrusion of the base.

7. The method according to claim 6, wherein, as a result of the centering the axis of the switching tube, the axis of the oil suction pipe and the axis of the on-load tap changer coincide so that a key and a kerosene drain screw are centered with respect to the axis of the on-load tap changer and positioned mechanically one on the other.

8. The method according to claim 7, wherein an element of the key mechanically positively cooperates with the kerosene drain screw.

9. A kerosene drain screw in a base of an on-load tap changer, mounted on a domed protrusion of the base of the on-load tap changer to be movable in the direction of an axis of the on-load tap changer, and carrying a cover disk by which at least one opening for kerosene in the base of the on-load tap changer is closable and openable.

10. The kerosene drain screw according to claim 9, further comprising:
 an encircling ring fastened to the kerosene drain screw and cooperating with an abutment in the base so as to limit an opening movement of the kerosene drain screw.

11. The kerosene drain screw according to claim 9, further comprising:
 a key having an element in an oil suction pipe of the on-load tap changer and mechanically positively fitting with the kerosene drain screw.

12. The kerosene drain screw according to claim 9, wherein the cover disk is in engagement with an annular depression in the base when the kerosene drain screw is closed and closes the opening for the kerosene outlet with a seal.

13. The kerosene drain screw according to claim 9, wherein the cover disk is a separate component fastened to the kerosene drain screw.

14. The kerosene drain screw according to claim 9, wherein the cover disk and the kerosene drain screw form an integral component.

15. The kerosene drain screw according to claim 14, further comprising:

an annular cap with at least one resilient element so biased relative to the cover disk that a key surface of the kerosene drain screw is inaccessible to a tool.

16. The kerosene drain screw according to claim 15, further comprising:
a transverse pin fixedly seated in the cap and cooperating with a pin movable axially of the on-load tap changer and of the kerosene drain screw.

\* \* \* \* \*